(12) United States Patent
Ye et al.

(10) Patent No.: US 12,015,587 B2
(45) Date of Patent: Jun. 18, 2024

(54) METHODS FOR UPDATING ROUTE, ACCESS DEVICE, AND CONVERGENCE DEVICE

(71) Applicant: New H3C Technologies Co., Ltd., Zhejiang (CN)

(72) Inventors: Jinrong Ye, Beijing (CN); Haina Zhong, Beijing (CN); Qing Gong, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 17/905,155

(22) PCT Filed: Feb. 28, 2020

(86) PCT No.: PCT/CN2020/077241
§ 371 (c)(1),
(2) Date: Aug. 26, 2022

(87) PCT Pub. No.: WO2021/168818
PCT Pub. Date: Sep. 2, 2021

(65) Prior Publication Data
US 2023/0093310 A1    Mar. 23, 2023

(51) Int. Cl.
*H04L 61/103* (2022.01)
*H04L 45/02* (2022.01)

(52) U.S. Cl.
CPC ............ *H04L 61/103* (2013.01); *H04L 45/04* (2013.01)

(58) Field of Classification Search
CPC .............................. H04L 45/04; H04L 61/103
(Continued)

(56) References Cited

U.S. PATENT DOCUMENTS 6,055,561 A * 4/2000 Feldman ............. H04L 12/4608
709/200
8,861,345 B2 * 10/2014 Hares ........................ H04L 9/40
709/224
(Continued)

FOREIGN PATENT DOCUMENTS

CN    106998297 A    8/2017
CN    107070787 A    8/2017
(Continued)

OTHER PUBLICATIONS

Machine-generated English-translation of Ye et al. (CN 110768901 A; filed Oct. 24, 2019) using Clarivate Analytics (pp. 1-22, 2019). (Year: 2019) (Year: 2019).*
(Continued)

*Primary Examiner* — David P Zarka
(74) *Attorney, Agent, or Firm* — McCoy Russell LLP (57) ABSTRACT

Provided are methods and apparatuses for updating a route. In the present disclosure, when an access device receives a first host route and a first sequence number sent by a BGP peer of the access device, regardless of the value of the first sequence number, the first host route is used as a route used by the access device to forward data to a target host, and a recorded first ARP entry corresponding to the target host is deleted, so as to trigger the BGP peer of the access device, for example, a convergence device, to withdraw host routes associated with the first ARP entry based on the existing route withdrawal mechanism.

14 Claims, 6 Drawing Sheets

101

Receive a first host route and a first sequence number which are sent by a BGP peer of the access device

102

Use the first host route as a route used by the access device to forward data to a host, and delete a recorded ARP entry corresponding to the host (58) Field of Classification Search
USPC .......................................................... 709/245
See application file for complete search history.

(56) References Cited

U.S. PATENT DOCUMENTS

| | | | |
|---|---|---|---|
| 9,191,139 B1* | 11/2015 | Venkata | H04L 12/6418 |
| 9,246,804 B1 | 1/2016 | Muir et al. | |
| 10,708,125 B1* | 7/2020 | Chen | H04L 65/1046 |
| 10,853,127 B2* | 12/2020 | Gao | G06F 9/4856 |
| 2008/0170578 A1* | 7/2008 | Ould-Brahim | H04L 12/4641 |
| | | | 370/401 |
| 2011/0171975 A1 | 7/2011 | Yin | |
| 2014/0086253 A1* | 3/2014 | Yong | H04L 49/70 |
| | | | 370/395.53 |
| 2016/0014025 A1* | 1/2016 | Wang | H04L 45/66 |
| | | | 370/392 |
| 2016/0036703 A1* | 2/2016 | Josyula | H04L 45/745 |
| | | | 370/392 |
| 2016/0134526 A1* | 5/2016 | Maino | G06F 9/45558 |
| | | | 709/226 |
| 2017/0317919 A1* | 11/2017 | Fernando | H04L 41/40 |
| 2019/0034226 A1 | 1/2019 | Gao et al. | |
| 2021/0200578 A1* | 7/2021 | Gao | H04L 12/4633 |
| 2021/0211404 A1* | 7/2021 | Pandey | H04L 63/1425 |

FOREIGN PATENT DOCUMENTS

| | | | | |
|---|---|---|---|---|
| CN | 107547349 A | 1/2018 | | |
| CN | 107612834 A | 1/2018 | | |
| CN | 107783815 A | 3/2018 | | |
| CN | 108418740 A | 8/2018 | | |
| CN | 108718277 A | 10/2018 | | |
| CN | 109587286 A | 4/2019 | | |
| CN | 110505621 A | 11/2019 | | |
| CN | 110768901 A * | 2/2020 | ............ | H04L 45/02 |
| CN | 110768901 A | 2/2020 | | |
| EP | 2974234 A1 | 1/2016 | | |
| EP | 3401783 A1 | 11/2018 | | |
| JP | 2003018197 A | 1/2003 | | |
| JP | 2010087585 A | 4/2010 | | |
| JP | 2014230216 A | 12/2014 | | |
| JP | 2014534782 A | 12/2014 | | |
| WO | 2014101708 A1 | 7/2014 | | |

OTHER PUBLICATIONS

European Patent Office, Extended European Search Report Issued in Application No. 20922374.2, Feb. 13, 2023, Germany, 15 pages.
ISA State Intellectual Property Office of the People's Republic of China, Written Opinion of the International Searching Authority Issued in Application No. PCT/CN2020/077241, Oct. 26, 2020, WIPO, 7 pages.
ISA State Intellectual Property Office of the People's Republic of China, International Search Report Issued in Application No. PCT/CN2020/077241, Oct. 26, 2020, WIPO, 4 pages.
State Intellectual Property Office of the People's Republic of China, Office Action and Search Report Issued in Application No. 202080000218.0, Jun. 1, 2022, 12 pages.

* cited by examiner

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type=0x07     | Sub-Type=0x00 |           Reserved=0          |
+-+-+-+-+-+-+-+-+-+-+-+-+-+-+-+-+-+-+-+-+-+-+-+-+-+-+-+-+-+-+-+-+
|                         Sequence Number                       |
+-+-+-+-+-+-+-+-+-+-+-+-+-+-+-+-+-+-+-+-+-+-+-+-+-+-+-+-+-+-+-+-+
```

METHODS FOR UPDATING ROUTE, ACCESS DEVICE, AND CONVERGENCE DEVICE

TECHNICAL FIELD

The present disclosure relates to network communication technology, and more particular, to a method and an apparatus for updating a route.

BACKGROUND

A host often migrates in a network, and therein examples of the host can be a wireless terminal (for example, a Wireless Local Area Network (WLAN) terminal), a wired terminal, a virtual machine, or the like. Taking the host being a WLAN terminal as an example, migration of the host can include roaming of the WLAN terminal. Taking the host being a virtual machine as an example, migration of the host can include migration of the virtual machine.

After the host migrates, the following problem often occurs: a convergence device cannot perceive the migration of the host in time, and still forwards packets directed to the host to an access device that the host accesses before the migration. For example, the access device can be a leaf node in a network with a spine-leaf structure, and the convergence device can be a spine node.

SUMMARY

The embodiments of the present disclosure provide a method and an apparatus for updating route, so as to prevent the convergence device from forwarding, after the host migrates, packets intended to the host to an access device that the host accesses before the migration.

The embodiments of present disclosure provide a method for updating a route, applied to an access device, the method includes: receiving a first host route and a first sequence number of the first host route which are sent by a Border Gateway Protocol (BGP) peer of the access device; where the first sequence number is a basis for the BGP peer to determine the first host route to be sent; preferably using the first host route as a route used by the access device to forward data to a host; and deleting a recorded Address Resolution Protocol (ARP) entry corresponding to the host, where an Internet Protocol (IP) address in the ARP entry and an IP address of the host are the same as a prefix in the first host route.

As an embodiment, the method further includes: sending an ARP request to the host, where a destination IP address of the ARP request is the IP address in the deleted ARP entry.

As an embodiment, the method further includes: when no ARP response is received within a specified time period after the ARP request is sent, detecting whether a number of times for sending the ARP request has reached a preset number of times; and when the number of times for sending the ARP request has not reached the preset number of times, sending the ARP request for another time.

As an embodiment, the method further includes: when an ARP response is received, learning ARP information based on the ARP response; generating a second host route from the ARP information, where a type of the second host route is a specified type used to indicate that the second host route is generated based on the ARP information; determining a second sequence number of the second host route; sending the second host route and the second sequence number to the BGP peer of the access device, and updating the route used by the access device to forward data to the host from the first host route to the second host route.

As an embodiment, determining the second sequence number of the second host route includes: checking whether there are one or more recorded host routes satisfying a condition, where the host route satisfying the condition is a route with a same prefix/prefix length as that in the second host route, sent by the BGP peer and having a sequence number; when there is no recorded host route satisfying the condition, taking a predefined initial value of a the sequence number as the second sequence number of the second host route; and when there are one or more recorded host routes satisfying the condition, determining the second sequence number of the second host route based on sequence numbers of all of the recorded host routes satisfying the condition.

As an embodiment, determining the second sequence number of the second host route based on the sequence numbers of all of the recorded host routes satisfying the condition includes: selecting a maximum sequence number having a largest value from the sequence numbers of all of the recorded host routes satisfying the condition; and taking a sum of the maximum sequence number and a specified value as the second sequence number of the second host route.

As an embodiment, preferably using the first host route as a route used by the access device to forward data to the host includes: checking whether there is an existing route used by the access device to forward data to the host in an IP forwarding table; if there is no existing route used by the access device to forward data to the host, distributing the first host route to the IP forwarding table; and if there is an existing route used by the access device to forward data to the host, updating the existing route used by the access device to forward data to the host in the IP forwarding table to the first host route.

As an embodiment, when deleting the recorded ARP entry, or after deleting the recorded ARP entry, the method further includes: withdrawing a recorded third host route, where a type of the third host route is a specified type used to indicate that the third host route is generated based on ARP information in the ARP entry; and sending a route withdrawal message to the BGP peer of the access device, where the route withdrawal message is used to indicate that the third host route has been withdrawn.

The embodiments of the present disclosure also provide an apparatus for updating a route, applied to an access device, the apparatus includes: a receiving unit configured to receive a first host route and a first sequence number of the first host route which are sent by a Border Gateway Protocol (BGP) peer of the access device; where the first sequence number is a basis for the BGP peer to determine the first host route to be sent; and a routing unit configured to preferably use the first host route as a route used by the access device to forward data to a host, and delete a recorded Address Resolution Protocol (ARP) entry corresponding to the host, where an Internet Protocol (IP) address in the ARP entry and an IP address of the host are the same as a prefix in the first host route.

The embodiments of the present disclosure also provide an electronic device, including: a processor and a machine-readable storage medium; where the machine-readable storage medium stores machine-executable instructions executable by the processor; and the processor is configured to execute the machine-executable instructions to implement the steps of any one of the above methods.

As can be seen from the above technical solutions, in the present disclosure, when the access device receives the first host route and the first sequence number sent by the BGP peer of the access device, regardless of the value of the first sequence number, the first host route is preferably used as a route used by the access device to forward data to the target host, and a recorded first ARP entry corresponding to the target host is deleted, so as to trigger the BGP peer of the access device, for example, the convergence device, to withdraw the host routes associated with the first ARP entry based on the existing route withdrawal mechanism. This prevents the convergence device from erroneously forwarding, after the target host migrates, packets directed to the target host to the access device that the target host accesses before the migration, thus ensuring correct data forwarding.

BRIEF DESCRIPTION OF THE DRAWINGS

The accompanying drawings, which are incorporated in and constitute a part of this specification, illustrate embodiments consistent with the disclosure and, together with the description, serve to explain the principles of embodiments of the present disclosure.

DETAILED DESCRIPTION OF THE EMBODIMENTS

Exemplary embodiments will be described in detail herein, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the present disclosure. Rather, they are merely examples of devices and methods consistent with some aspects of the present disclosure as detailed in the appended claims.

The terms used in the present disclosure are for the purpose of describing particular embodiments only and are not intended to limit the present disclosure. The singular forms "a", "the" and "this" used in the present disclosure and the appended claims are intended to include the plural forms as well, unless the context clearly indicates other meanings.

In order to enable those skilled in the art to better understand the technical solutions provided by the embodiments of the present disclosure, and to make the objects, features, and advantages of the embodiments of the present disclosure more obvious and understandable, the technical solutions in the embodiments of the present disclosure will be further described in detail below with reference to the accompanying drawings.

Figure 1:
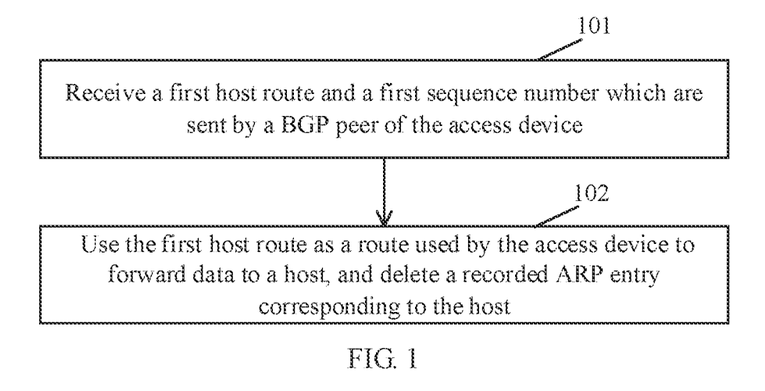
FIG. 1 is a flowchart illustrating a method for updating a route according to an embodiment of the present disclosure.

Referring to FIG. 1, FIG. 1 is a flowchart illustrating a method for updating a route according to an embodiment of the present disclosure. The method may be applied to an access device. For example, the access device can be a leaf node in a spine-leaf networking structure.

As shown in FIG. 1, the process can include the following blocks 101-102.

In block 101, a first host route and a first sequence number which are sent by a Border Gateway Protocol (BGP) peer of the access device are received.

In actual application, the access device can establish a BGP neighbor relationship with a convergence device to which the access device is connected based on a BGP, and the access device and the convergence device serve as BGP peers to each other, i.e., the convergence device being a BGP peer of the access device, and the access device being a BGP peer of the convergence device.

In the embodiment, the first sequence number is a sequence number of the first host route, and is a basis for the BGP peer of the access device, such as the convergence device, to determine the first host route to be sent. As for how the BGP peer of the access device, such as the convergence device, determines the first host route to be sent based on the first sequence number, please refer to block 302 of the process shown in FIG. 3 for details, which will not be repeated here. It should be noted that the first host route and the first sequence number are named as such for convenience of description, but not for limitation.

In block 102, the first host route is used as a route used by the access device to forward data to a host, and a recorded Address Resolution Protocol (ARP) entry corresponding to the host is deleted.

In block 102, the host refers to a host having an Internet Protocol (IP) address which is the same as a prefix in the first host route. For ease of description, the host is referred to as a target host herein.

In block 102, an IP address in the recorded ARP entry is the same as the prefix in the first host route. For ease of description, the recorded ARP entry is referred to as a first ARP entry herein.

In one example, an IP forwarding table is used to guide data forwarding, and records routes used by the access device to forward data to each host. Based on this, as an embodiment, in block 102, using the first host route as a route used by the access device to forward data to the target host can include: checking whether there is a route used by the access device to forward data to the target host (referred to as an existing route) in the IP forwarding table; if there is no existing route, distributing the first host route to the IP forwarding table; and if there is the existing route, updating the existing route in the IP forwarding table to the first host route. It should be noted that the existing route is not a custom route, but is named for convenience of description. Finally, the first host route is distributed to the IP forwarding table as the route used by the access device to forward data to the target host, so as to guide the access device to forward data to the target host.

As described in block 101, the first host route is received from the BGP peer of the access device, and can be understood as a remote route. Therefore, in block 102, when the remote route, that is, the first host route, is used as the route used by the access device to forward data to the host, the recorded first ARP entry corresponding to the target host (which has been established previously when the target host is a local host) becomes unnecessary, and therefore, the recorded first ARP entry can be deleted. Deletion of the first ARP entry can trigger withdrawal of one or more host routes associated with the first ARP entry, details of which can refer to the description of the embodiments below. Through the withdrawal of the host routes associated with the first ARP entry, it can be ensured that after the migration of the target host, the convergence device will not mistakenly forward packets intended to the target host to the access device that the target host accesses before the migration, but will directly send the packets to the access device that the target host accesses after the migration, and correct data forwarding can be ensured.

It can be seen from the process shown in FIG. 1 that, in the present disclosure, when the access device receives the first host route and the first sequence number sent by the BGP peer of the access device, regardless of the value of the first sequence number, the first host route (i.e., the remote route) is used as a route used by the access device to forward data to the target host, and the recorded first ARP entry corresponding to the target host is deleted, to trigger the BGP peer of the access device, for example, the convergence device, to withdraw the host routes associated with the first ARP entry based on the existing route withdrawal mechanism. This prevents the convergence device from erroneously forwarding, after the target host migrates, packets to be sent to the target host to the access device that the target host accesses before the migration, thus ensuring correct data forwarding.

As an embodiment, in block 102, before or after deleting the first ARP entry, or when deleting the first ARP entry, it can be further detected whether the target host is still accessed to the access device. The purpose of detecting whether the target host is still accessed to the access device is to prevent the case where the first host route is learned when an attacker pretends to be the target host. If the first host route is learned when an attacker pretends to be the target host, the first host route is used as a route used by the access device to forward data to the target host as described in block 102 will cause a lot of data to be forwarded to the attacker. Based on this, in order to timely prevent the data being forwarded (especially being forwarded for a long time) to the attacker, it is necessary to further detect whether the target host is still accessed to the access device.

As an embodiment, detecting whether the target host is still accessed to the access device can include the following step a.

In step a, an ARP request is sent to the target host. In one example, a destination IP address of the ARP request is the IP address in the first ARP entry.

In the application, a situation might happen that the above ARP request cannot reach the target host due to the influence of network instability. To avoid this situation, in an example, when no ARP response is received within a specified time period after the ARP request is sent, it is detected whether a number of times for sending the ARP request has reached a preset number of times. When the preset number of times has not been reached, the ARP request is sent for another time. When the preset number of times has been reached, the process of sending an ARP request is ended. In specific implementation, the specified time period and the preset number of times can be set according to actual conditions, for example, the specified time period is set to 200 milliseconds, and the preset number of times is set to 3.

As an embodiment, after the ARP request is sent, if an ARP response corresponding to the ARP request is received (a source IP address of the ARP response is the IP address of the target host), it means that the target host is still accessed to the access device at this time. Based on this, the process shown in FIG. 2 can be performed.

Figure 2:
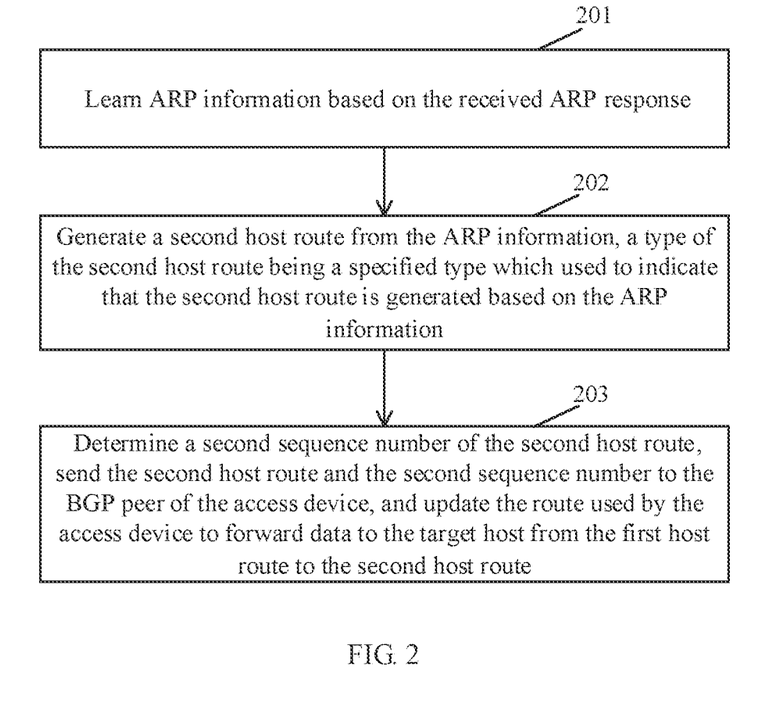
FIG. 2 is a flowchart illustrating a process upon receiving an ARP response according to an embodiment of the present disclosure.

As shown in FIG. 2, the process can include the following blocks 201-203.

In block 201, ARP information is learned based on the received ARP response.

The reason why the ARP information is learned is to establish an ARP entry (referred to as a second ARP entry in order to be distinguished from the above-mentioned first ARP entry). The ARP information and the structure of the ARP entry will be described in the following specific embodiments, which will not be described here.

In block 202, a second host route is generated from the ARP information, a type of the second host route being a specified type which is used to indicate that the second host route is generated based on the ARP information.

As an embodiment, generating the second host route from the ARP information in block 202 can include: based on the ARP information and rule requirements of the host route, generating a second host route that satisfies the rule requirements. The ARP information and how to generate a host route based on the ARP information will be described below through embodiments, which will not be repeated here.

In block 203, a second sequence number of the second host route is determined, the second host route and the second sequence number are sent to the BGP peer of the access device, and the route used by the access device to forward data to the target host is updated from the first host route to the second host route.

Based on the description of the IP forwarding table, in an embodiment, updating the route used by the access device to forward data to the target host from the first host route to the second host route in block 203 can include: updating, the route used by the access device to forward data to the target host, which is recorded in the IP forwarding table, from the first host route to the second host route. That is, the second host route is recorded in the IP forwarding table as a route preferably used by the access device to forward data to the target host.

There are many implementations for determining the second sequence number of the second host route in block 203. One of the implementations can include: checking whether there are one or more recorded host routes satisfying a condition. For example, the host route satisfying the condition can be a host route with a same prefix/prefix length as that in the second host route, notified by the BGP peer and having a sequence number. When there is no such recorded host route satisfying the condition, a predefined initial value of a sequence number (such as 0) is taken as the second sequence number of the second host route. When there are one or more recorded host routes satisfying the condition, the second sequence number of the second host route is determined based on the sequence numbers of all of the recorded host routes satisfying the condition.

In one embodiment, determining the second sequence number of the second host route based on the sequence numbers of all of the recorded host routes satisfying the condition can include: selecting a maximum sequence number having the largest value from the sequence numbers of all of the host routes satisfying the condition; and taking a sum of the maximum sequence number and a specified value (such as 1) as the second sequence number of the second host route.

So far, the process shown in FIG. 2 is completed.

Through the process shown in FIG. 2, the route used by the access device to forward data to the target host can be updated from the first host route (that is, the remote route) received previously to the second host route (that is, the local route) in time, thus preventing a lot of data from being forwarded to the attacker.

The above describes the method for updating a route provided by the embodiments of the present disclosure from the perspective of an access device. The method for updating a route provided by the embodiments of the present disclosure will be described below from the perspective of a convergence device.

Figure 3:
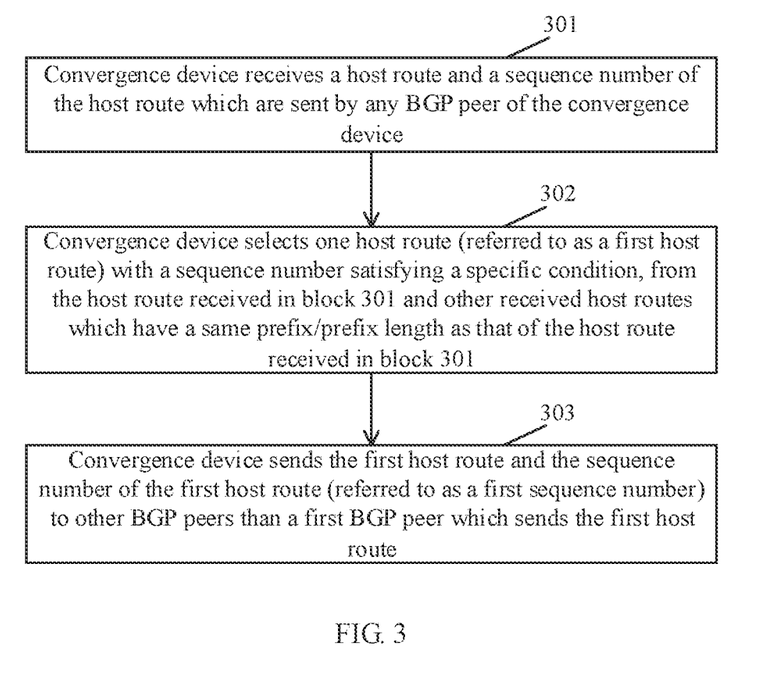
FIG. 3 is a flowchart illustrating another method for updating a route according to an embodiment of the present disclosure.

Referring to FIG. 3, FIG. 3 is a flowchart illustrating another method for updating a route according to an embodiment of the present disclosure. This process is applied to a convergence device. For example, the convergence device herein can be a spine node in a spine-leaf networking structure.

As shown in FIG. 3, the process can include the following blocks 301-303.

In block 301, the convergence device receives a host route and a sequence number of the host route which are sent by any BGP peer of the convergence device.

In one embodiment, the convergence device and the access device to which the convergence device is connected are BGP peers to each other. Therefore, the BGP peer of the convergence device can be an access device, such as the access device involved in the processes shown in FIG. 1 and FIG. 2.

In block 302, the convergence device selects one host route (referred to as a first host route) with a sequence number satisfying a specific condition, from the host route received in block 301 and other received host routes which have a same prefix/prefix length as that of the host route received in block 301.

Corresponding to the process shown in FIG. 1, the selected host route with a sequence number satisfying a specified condition can be referred to as the first host route. As an embodiment, in block 302, selecting one host route (referred to as the first host route) with a sequence number satisfying a specific condition from the host route received in block 301 and other received host routes which have the same prefix/prefix length as that of the host route received in block 301 can have many implementations. For example, one of the implementations can include: selecting one or more host routes with the largest sequence number from the host route received in block 301 and other received host routes which have the same prefix/prefix length as that of the host route received in block 301; when the number of selected host routes with the largest sequence number is 1, taking the selected host route with the largest sequence number as the one host route (referred to as the first host route) with a sequence number satisfying a specific condition; when the number of selected host routes with the largest sequence number is larger than 1, determining a host route from the selected host routes with the largest sequence number based on a preset route determination method, and taking the determined host route as the one host route (referred to the first host route) with a sequence number satisfying a specific condition. Herein, there are many preset route determination methods, such as route priority, reachability of next hop configured for a route, which are not limited by the embodiments of the present application. Through the above description, it can be achieved to select, with sequence numbers being a selection basis, one host route (referred to the first host route) with a sequence number satisfying a specific condition. It should be noted that the selected first host route may be, or may not be, the host route received by the convergence device in block 301.

In block 303, the convergence device sends the first host route and the sequence number of the first host route (referred to as a first sequence number) to other BGP peers than a first BGP peer which sends the first host route.

So far, the process shown in FIG. 3 is completed. It can be seen from the process shown in FIG. 3 that every time the convergence device receives a host route and a sequence number which are sent by any BGP peer of the convergence device, performing of the above blocks 302 to 303 will be triggered, so as to trigger the BGP peers of the convergence device to update a route in time (see the process shown in FIG. 1 for details).

The following takes a spine-leaf networking structure as an example to describe the process shown in FIG. 1 to FIG. 3 through a specific embodiment.

Figure 4:
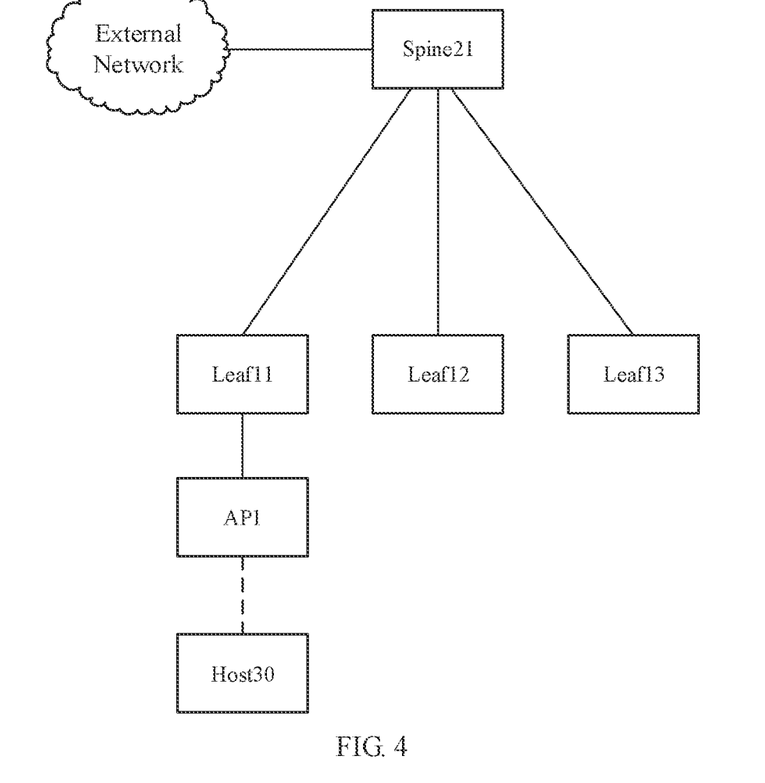
FIG. 4 is a schematic diagram illustrating networking in a method for updating a route according to an embodiment of the present disclosure.

Referring to FIG. 4, FIG. 4 is a schematic diagram illustrating networking in a method for updating a route according to an embodiment of the present disclosure. The networking shown in FIG. 4 takes three access devices (Leaf11, Leaf12, Leaf13) and one convergence device (Spine21) as an example. In FIG. 4, Leaf11, Leaf12, and Leaf13 are all BGP peers of Spine21.

Initially, a host 30 is accessed to Leaf11. In the embodiments of the present disclosure, the host 30 can directly access Leaf11, or can access Leaf11 through a two-layer device, such as an access point (AP). FIG. 4 takes the host 30 being accessed to Leaf11 through an AP (shown as AP1) as an example.

Leaf11 learns ARP information corresponding to the host 30. In the embodiments of the present disclosure, Leaf11 can learn the ARP information corresponding to the host 30 according to the existing ARP information learning way. For example, the ARP information corresponding to the host 30 is learned by receiving an ARP response or an ARP request sent by the host 30. In one example, the ARP information mainly includes: an IP address of the host 30 (for example, 10.1.1.2), a Media Access Control (MAC) address (for example, 02e0-f102-00231), a Virtual Local Area Network (VLAN) to which the host 30 belongs (for example, VLAN100), and an interface on Leaf11 through which the host 30 accesses Leaf11 (that is, the interface through which the ARP information is learnt, for example, XGE1/0/1).

Leaf11 establishes an ARP entry (referred to as ARP entry 4_1) corresponding to the host 30 based on the learned ARP information. Table 1 shows the structure of the ARP entry 4_1:

TABLE 1

| IP address | MAC address | VLAN | Interface |
| --- | --- | --- | --- |
| 10.1.1.2 | 02e0-f102-00231 | VLAN100 | XGE1/0/1 |

In Table 1, 10.1.1.2 is the IP address of the host 30, 02e0-f102-00231 is the MAC address of the host 30, VLAN100 is the VLAN to which the host 30 belongs, and XGE1/0/1 is the interface on Leaf11 through which the host 30 accesses Leaf11 (that is, the interface through which the ARP information is learnt).

Leaf11 generates a corresponding host route (referred to as route Rt1) according to the ARP entry 4_1. In one example, Leaf11 can convert ARP entry 4_1 into a corresponding route Rt1 according to rule requirements of a route, and the obtained route Rt1 meets the rule requirements of a route. It should be noted that, to distinguish the route Rt1 from other host routes, herein, the type of the route Rt1 can be set to a specified type to indicate that the route Rt1 is generated based on the ARP entry. In addition, since the route Rt1 is generated based on the ARP entry, the route Rt1 can also be called "ARP host route".

Leaf11 adds the route Rt1 to a Routing Information Base (RIB), and sets the type of an entry of the route Rt1 (referred to route entry 4_2) newly added in the RIB to the above specified type. Table 2 shows the structure of the route entry 4_2.

TABLE 2

| Destination/Mask | Proto/SubProto | Pre | Cost | NextHop | Interface |
|---|---|---|---|---|---|
| 10.1.1.2/32 | specified type | set value | set value | 10.1.1.2 | VLAN100 |

In Table 2, Destination/Mask represents the prefix/prefix length of the route Rt1. Proto/SubProto (protocol/subprotocol) has a specified type, such as Direct/ARP, which means that the protocol type corresponding to the route Rt1 is ARP, and is also used to indicate that the route Rt1 is generated based on ARP information. Pre (precedence) indicates a priority of the route. Cost (metric) represents a metric of the route. NextHop represents next hop. Interface represents an outbound interface of the route.

In an embodiment, after adding the route Rt1 to the RIB (Routing Information Base), Leaf11 can also preferably distribute the route Rt1 to the IP forwarding table, so as to rely on the route Rt1 in the IP forwarding table to forward data to the host 30.

Leaf11 determines a sequence number of the route Rt1. In one example, Leaf11 checks whether there is a host route satisfying a condition recorded in the RIB. For example, the host route satisfying a condition is a host route with the same prefix/prefix length as that in the route Rt1, sent by the BGP peer of Leaf11 and having a sequence number. If Leaf11 checks that no host route satisfying the condition is recorded, a predefined initial value of a sequence number (taking 0 as an example) will be used as the sequence number of Rt1.

Leaf11 sends the route Rt1 (this embodiment takes sending the prefix/prefix length of the route Rt1 as an example) and the sequence number of the route Rt1 to the BGP peer (that is, Spine21). In one example, Leaf11 can send the route Rt1 and the sequence number of the route Rt1 (take 0 as an example) to the BGP peer (that is, Spine21) through a BGP UPDATE message. It should be noted that, in order to carry a sequence number in the BGP UPDATE message, in this embodiment, an extended community attribute field can be added to the BGP UPDATE message. In one example, the extended community attribute field can be set in a path attribute of a BGP UPDATE message. The specific position of the extended community attribute field in the path attribute is not limited in the embodiments of the present disclosure. In addition, as an example, the length of the extended community attribute field is 8 bytes.

Figure 5:
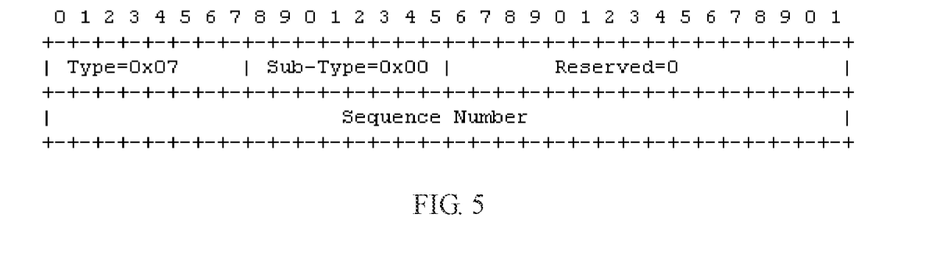
FIG. 5 is a schematic structural diagram illustrating an extended community attribute field according to an embodiment of the present disclosure.

FIG. 5 illustrates an example of the structure of an extended community attribute field. As shown in FIG. 5, the extended community attribute field includes: Type, used to indicate a type, which is different from the type value defined by BGP, FIG. 5 taking the Type being 0x07 as an example; Sub-Type, used to indicate a sub-type, which is different from the type value defined by BGP, FIG. 5 taking the Sub-Type being 0x00 as an example; Reserved, used to indicate a reserved field; and Sequence Number, used to carry a sequence number, such as the sequence number of the route Rt1.

When Spine21 receives the route Rt1 and the sequence number of the route Rt1 sent by Leaf11, and finds that Spine21 has not received, a host route with a same prefix/prefix length as that of the route Rt1 and having a sequence number, from other BGP peers, Spine21 adds the route Rt1 and the sequence number of the route Rt1 to the RIB (so that the route Rt1 and the sequence number of the route Rt1 can be added to the IP forwarding table by the RIB).

Spine21 sends the route Rt1 and the sequence number of the route Rt1 to other BGP peers (Leaf12 and Leaf13). Upon receiving the route Rt1 and the sequence number of the route Rt1 which are sent by Spine21, Leaf12 and Leaf13 record the route Rt1 and the sequence number of the route Rt1 to the RIB, and distribute the route Rt1 to the local IP forwarding table, so as to rely on the route Rt1 in the IP forwarding table to forward data to the host 30.

The following takes the migration of the host 30 as an example.

Figure 6:
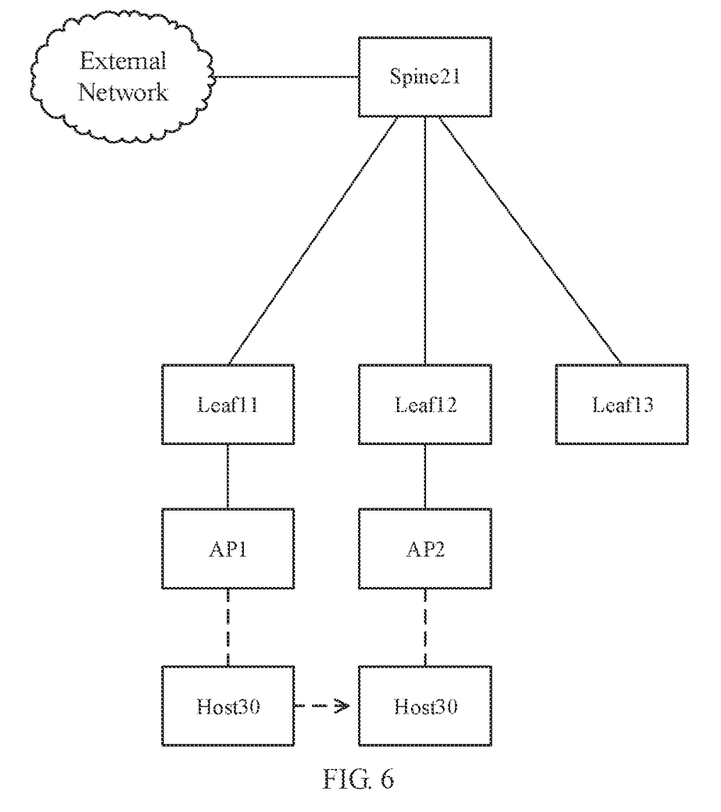
FIG. 6 is a schematic diagram illustrating another networking in a method for updating a route according to an embodiment of the present disclosure.

If the host 30 migrates from Leaf11 to Leaf12, FIG. 6 shows a schematic diagram of the host 30 migrating from Leaf11 to Leaf12. After the host 30 migrates from Leaf11 to Leaf12, Leaf12 learns ARP information corresponding to the host 30 and establishes an ARP entry corresponding to the host 30 (referred to as ARP entry 4_3). Table 3 shows the structure of the ARP entry 4_3.

TABLE 3

| IP address | MAC address | VLAN | Interface |
|---|---|---|---|
| 10.1.1.2 | 02e0-f102-00231 | VLAN100 | XGE1/1/1 |

Leaf12 generates a corresponding host route (as route Rt2) based on the ARP entry 4_3, adds the route Rt2 to the RIB (Routing Information Base), and sets the type of an entry of the route Rt2 (referred to as route entry 4_4) newly added in the RIB to the above specified type. Table 4 shows the structure of the route entry 4_4:

TABLE 4

| Destination/Mask | Proto/SubProto | Pre | Cost | NextHop | Interface |
|---|---|---|---|---|---|
| 10.1.1.2/32 | specified type | set value | set value | 10.1.1.2 | VLAN100 |

After Leaf12 adds the route Rt2 to the RIB, Leaf12 can also update the route used to forward data to the host 30 in the IP forwarding table to the route Rt2, so as to rely on the route Rt2 in the IP forwarding table to forward data to the host 30.

Leaf12 determines the sequence number of the route Rt2. In one example, Leaf12 checks whether there is a recorded host route satisfying a condition in the RIB. For example, the host route satisfying a condition is a host route with a same prefix/prefix length as that in the route Rt2, sent by the BGP peer of Leaf12 and having a sequence number. When Leaf12 checks that an existing host route satisfying the condition has been recorded, if the sequence number of the existing host route satisfying the condition is identical to the sequence number of the route Rt1 (here, taking 0 as an example), a sum of the sequence number of the route Rt1 and a specified value (such as 1) is taken as the sequence number of the route Rt2 (taking the sequence number of the route Rt2 being 1 as an example).

Leaf12 sends the route Rt2 (taking sending the prefix/prefix length of the route Rt2 as an example in the embodiments of the present disclosure) and the sequence number of the route Rt2 to the BGP peer (i.e., Spine21). Here, the manner in which Leaf12 sends the route Rt2 and the sequence number of the route Rt2 to the BGP peer (that is, Spine21) is similar to the manner in which the Leaf11 sends the route Rt1 and the sequence number of the route Rt1 to the BGP peer (that is, Spine21), and details will not be described herein.

When Spine21 receives the route Rt2 and the sequence number of the route Rt2 which are sent by Leaf12, Spine21 selects a host route having the largest sequence number, from the route Rt2 and other previously-received host routes with the same prefix/prefix length as that of the route Rt2 and with sequence numbers. If the previously-received host route with the same prefix/prefix length as that of the route Rt2 and with a sequence number is the route Rt1, since the sequence number of the route Rt1 is 0, and the sequence number of the route Rt2 is 1, then in one embodiment, Spine21 selects a host route with a larger sequence number, that is, the route Rt2, adds the route Rt2 to the RIB (so that the route Rt2 is added to the IP forwarding table by the RIB), and sends the route Rt2 and the sequence number of the route Rt2 to other BGP peers (Leaf11 and Leaf13).

Upon receiving the route Rt2 and the sequence number of the route Rt2 which are sent by Spine21, Leaf13 records the route Rt2 and the sequence number of the route Rt2 to the RIB, and updates the route Rt1 used to forward data to the host 30 in the local IP forwarding table to the route Rt2, so as to rely on the route Rt2 in the IP forwarding table to forward data to the host 30.

Upon receiving the route Rt2 and the sequence number of the route Rt2 which are sent by Spine21, Leaf11 records the route Rt2 and the sequence number of the route Rt2 to the RIB, and updates the route Rt1 used to forward data to the host 30 in the local IP forwarding table to the route Rt2, so as to rely on the route Rt2 in the IP forwarding table to forward data to the host 30.

Leaf11 further uses the prefix/prefix length of the route Rt2 as a keyword to find an ARP entry with a same IP address as the keyword (that is, the ARP entry 4_1). Leaf11 deletes the ARP entry 4_1 and sends an ARP request (the destination IP address of the ARP request is the IP address in the ARP entry 4_1, that is, the IP address of the host 30). If no corresponding ARP response is received within a specified time period (such as 200 milliseconds) after sending the ARP request, Leaf11 checks whether a number of times for sending the ARP request has reached a preset number of times (such as 3 times). If the preset number of times has not been reached, Leaf11 sends the ARP request again. If the preset number of times has been reached, the process of sending an ARP request is ended. When Leaf11 receives an ARP response, it indicates that the host (i.e. the host 30) with the IP address being the destination IP address of the ARP request is still accessed to Leaf11 currently, Leaf11 learns the ARP information based on the ARP response, and returns to the operation performed by the Leaf11 after learning the ARP information. When Leaf11 receives no ARP response, it is determined that the host 30 is not accessed to Leaf11 any longer.

It should be noted that when Leaf11 deletes the ARP entry 4_1, Leaf11 also deletes the route entry 4_2 corresponding to the ARP entry 4_1 in the RIB (Routing Information Base) (which also means withdrawing the route Rt1). Leaf11 sends a route withdrawal message to the BGP peer (that is, Spine21). The route withdrawal message is used to indicate that the route Rt1 has been withdrawn. When Spine21 receives the route withdrawal message, and finds that the currently preferred host route is the route Rt2, but not the withdrawn route Rt1 indicated by the route withdrawal message, Spine21 will delete the recorded route Rt1. If Spine21 receives the route withdrawal message, and finds that the currently preferred host route is the route Rt1, which is exactly the withdrawn route indicated by the route withdrawal message, Spine21 will delete the recorded withdrawn route indicated by the route withdrawal message and returns to the operation of selecting a host route again.

It should also be noted that, during the migration of the host 30 from Leaf11 to Leaf12 described above, a special case often occurs: the host 30 immediately migrates to Leaf12 as soon as Leaf11 goes online, and Leaf12 has not received the route Rt1 and the sequence number of the route Rt1 which are sent by Spine21, or Leaf12 has received the route Rt1 and the sequence number of the route Rt1 which are sent by Spine21 but has not recorded them to the RIB. In this special case, if Leaf12 exactly determines the sequence number of the route Rt2 at this time, Leaf12 determines the sequence number of the route Rt2 as an initial value of a sequence number (take 0 as an example). As described above, Leaf12 sends the route Rt2 and the sequence number of the route Rt2 to the BGP peer (that is, Spine21). When Spine21 receives the route Rt2, Spine21 can find that the sequence number of the route Rt1 with the same prefix/prefix length as that of the route Rt2 is the same as the sequence number of the route Rt2, both of them are 0. At this time, Spine21 can randomly select a route, or can select a route based on existing route preference rules. When Spine21 selects the route Rt1, since the host 30 has migrated from Leaf11 to Leaf12 at this time, it can cause temporary data forwarding errors such as forwarding data intended to the host 30 to Leaf11. However, the duration of this data forwarding error is relatively short, because when Spine21 selects the route Rt1, Spine21 will also send the route Rt1 and the sequence number of the route Rt1 to other BGP peers (Leaf12 and Leaf13); and when Leaf12 receives the route Rt1 and the sequence number of the route Rt1, Leaf12 will process in the same way as that Leaf11 receives the route Rt2 and the sequence number of the route Rt2 which are sent by Spine21. Eventually, Spine21 will select the route Rt2 and forward the data intended to the host 30 to Leaf12 to forward the data to the host 30 through Leaf12, ensuring correct data forwarding.

The methods provided in the embodiments of the present disclosure have been described above.

It can be seen from the above embodiments that when any Leaf receives a host route sent by Spine, regardless of the sequence number of the host route, the host route sent by Spine is preferably distributed to the IP forwarding table to guide data forwarding, and the corresponding ARP entry (the IP address in the ARP entry is the same as the prefix of the received host route) is deleted, so as to withdraw a host route corresponding to the deleted ARP entry timely, and trigger Spine to withdraw the host route timely by sending a route withdrawal message to Spine. It can ensure that, after the host migrates, packets intended to the host can be forwarded to the Leaf that the host accesses after the migration in time.

Further, when Leaf deletes the corresponding ARP entry, Leaf also sends an ARP request for the corresponding IP address (same as the route prefix of the host route, and also the IP address in the deleted ARP entry) to detect whether the corresponding host is still accessed to the Leaf, so as to prevent incorrect packet forwarding.

The method for updating a route provided in the present disclosure has been described above, and an apparatus for updating a route provided in the present disclosure will be described below.

Figure 7:
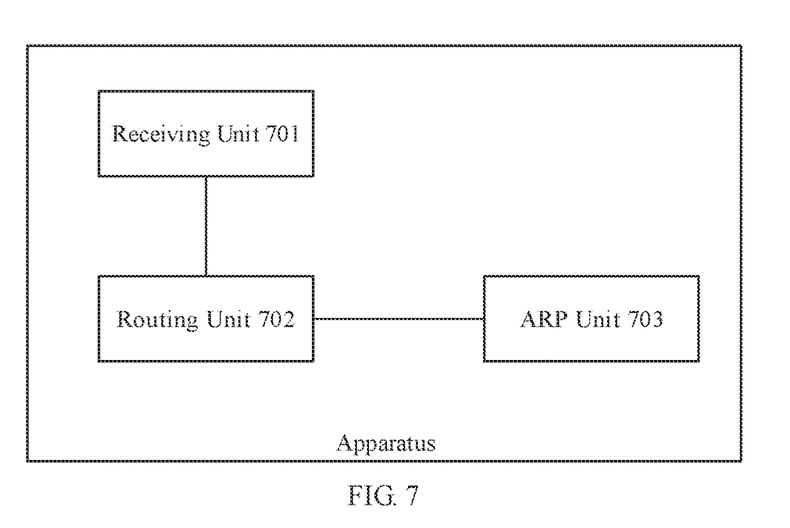
FIG. 7 is a block diagram illustrating an apparatus for updating a route according to an embodiment of the present disclosure.

Referring to FIG. 7, FIG. 7 is a block diagram illustrating an apparatus for updating a route according to an embodiment of the present disclosure. The apparatus is applied to an access device and includes a receiving unit 701 and a routing unit 702.

The receiving unit 701 is configured to receive a first host route and a first sequence number of the first host route which are sent by a BGP peer of the access device; where the first sequence number is a basis for the BGP peer to determine the first host route to be sent.

The routing unit 702 is configured to preferably use the first host route as a route used by the access device to forward data to a host, and delete a recorded ARP entry corresponding to the host, where an IP address in the ARP entry and an IP address of the host are respectively the same as a prefix in the first host route.

As an embodiment, the apparatus further includes an ARP unit 703, configured to send an ARP request to the host, where a destination IP address of the ARP request is the same as the prefix in the first host route.

In an example, the ARP unit 703 is configured to, if no ARP response is received within a specified time period after the ARP request is sent, detect whether a number of times for sending the ARP request have reached a preset number of times; when the number of times for sending the ARP request has not reached the preset number of times, send the ARP request again.

As an embodiment, upon receiving the ARP response, the ARP unit 703 learns ARP information based on the ARP response.

Based on this, the routing unit 702 generates a second host route from the ARP information, determines a second sequence number of the second host route, sends the second host route and the second sequence number to the BGP peer of the access device, and updates the route used by the access device to forward data to the host from the first host route to the second host route. Here, a type of the second host route is a specified type used to indicate that the second host route is generated based on the ARP information.

In one example, the routing unit 702 determining the second sequence number of the second host route can include: checking whether there are one or more recorded host routes satisfying a condition, where the host route satisfying the condition is a host route with a same prefix/prefix length as that in the second host route, sent by the BGP peer and having a sequence number; when there is no recorded host route satisfying the condition, taking a predefined initial value of a sequence number as the second sequence number of the second host route; and when there are one or more recorded host routes satisfying the condition, determining the second sequence number of the second host route based on sequence numbers of all of the recorded host routes satisfying the condition.

As an embodiment, the routing unit 702 determining the second sequence number of the second host route based on the sequence numbers of all of the recorded host routes satisfying the condition can include: selecting a maximum sequence number having a largest value from the sequence numbers of all of the recorded host routes satisfying the condition; and taking a sum of the maximum sequence number and a specified value as the second sequence number of the second host route.

As an embodiment, the routing unit 702 preferably using the first host route as a route used by the access device to forward data to the host can include: checking whether there is a route (referred to as an existing route) used by the access device to forward data to the host in an IP forwarding table; if there is no existing route used by the access device to forward data to the host, distributing the first host route to the IP forwarding table; and if there is an existing route used by the access device to forward data to the host, updating the existing route in the IP forwarding table to the first host route.

In one embodiment, the routing unit 702 is further configured to, withdraw a recorded third host route when deleting the recorded ARP entry, or after deleting the recorded ARP entry, where a type of the third host route is a specified type used to indicate that the third host route is generated based on the ARP information in the ARP entry; and send a route withdrawal message to the BGP peer of the access device, where the route withdrawal message is used to indicate that the third host route has been withdrawn.

So far, the description of the structure of the apparatus for updating a route shown in FIG. 7 is completed.

Figure 8:
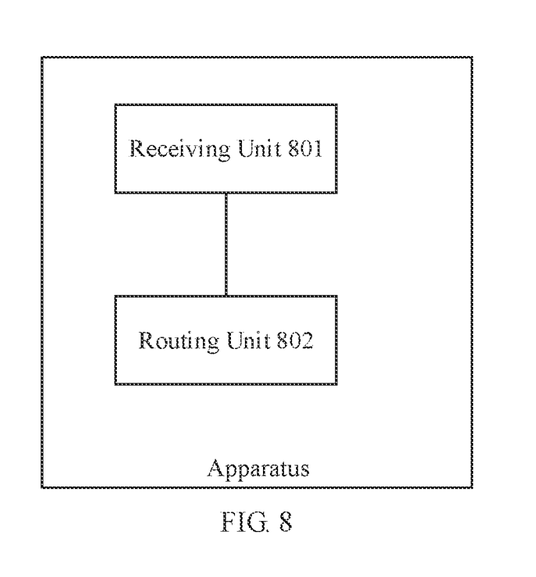
FIG. 8 is a block diagram illustrating another apparatus for updating a route according to an embodiment of the present disclosure.

Referring to FIG. 8, FIG. 8 is a block diagram illustrating another apparatus for updating a route provided by the present disclosure. The apparatus is applied to a convergence device and can include a receiving unit 801 and a routing unit 802.

The receiving unit 801 is configured to receive a host route and a sequence number of the host route which are sent by a BGP peer of the convergence device.

The routing unit 802 is configured to select one host route (referred to as a first host route) with a sequence number satisfying a specific condition from the above host route received by the receiving unit 801 and other received host routes which have a same prefix/prefix length as that of the above host route received by the receiving unit 801, and send the first host route and the sequence number of the first host route (referred to as a first sequence number) to other BGP peers than a first BGP peer which sends the first host route.

As an embodiment, the routing unit 802 selecting one host route (referred to as a first host route) with a sequence number satisfying a specific condition from the above host route received by the receiving unit 801 and other received host routes which have the same prefix/prefix length as that of the above host route received by the receiving unit 801 can include: selecting one or more host routes with the largest sequence number from the above host route received by the receiving unit 801 and other received host routes which have the same prefix/prefix length as that of the above host route received by the receiving unit 801; when the number of selected host routes with the largest sequence number is 1, taking the selected host route with the largest sequence number as the one host route (referred to as the first host route) with a sequence number satisfying a specific condition; when the number of selected host routes with the largest sequence number is larger than 1, determining a host route from the selected host routes with the largest sequence number based on a preset route determination method, and taking the determined host route as the one host route (referred to the first host route) with a sequence number satisfying a specific condition. Herein, there are many preset route determination methods, such as route priority, reachability of next hop configured for a route, which are not limited by the embodiments of the present application. Through the above description, it can be achieved to select, with sequence numbers being a selection basis, one host route (referred to the first host route) with a sequence number satisfying a specific condition is selected based on the sequence number.

As an embodiment, the receiving unit 801 is further configured to receive a route withdrawal message. The route withdrawal message is used to indicate a withdrawn host route. When the receiving unit 801 receives the route withdrawal message, the routing unit 802 can further withdraw the host route indicated by the route withdrawal message.

So far, description of the apparatus as shown in FIG. 8 is completed.

Figure 9:
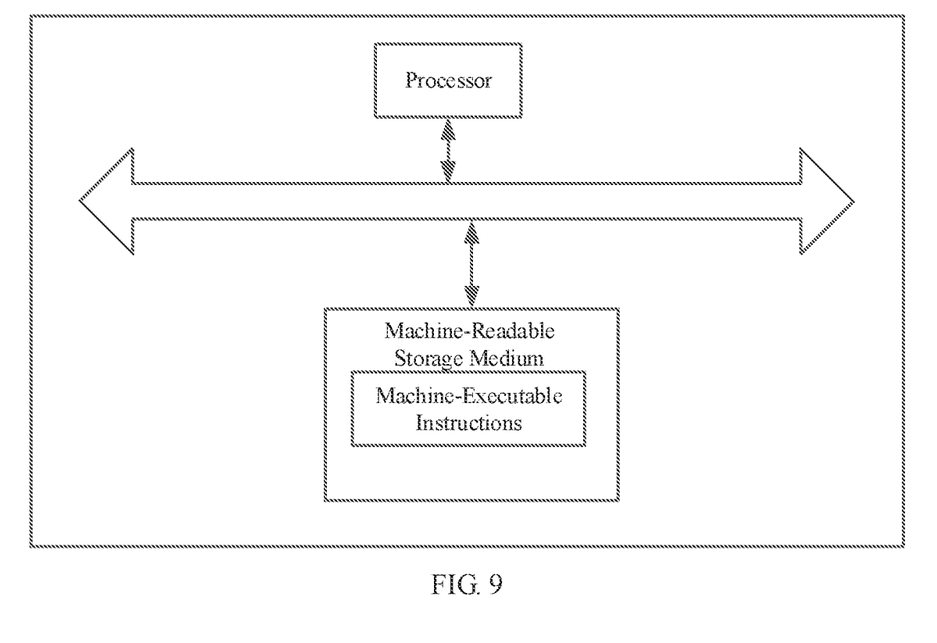
FIG. 9 is a block diagram illustrating an electronic device according to an embodiment of the present disclosure.

Based on the same application concept as the above methods, an embodiment of the present disclosure further provides an electronic device. The structure of the electronic device is shown in FIG. 9, and can include a processor and a machine-readable storage medium.

The machine-readable storage medium stores machine-executable instructions that can be executed by the processor.

The processor is configured to execute machine-executable instructions to implement the methods disclosed in the embodiments of the present disclosure described above.

As an example, the above-mentioned machine-readable storage medium can be any electronic, magnetic, optical, or other physical storage devices, and can contain or store information, such as executable instructions, data, and so on. For example, the machine-readable storage medium can be: a RAM (Radom Access Memory, random access memory), a volatile memory, a non-volatile memory, a flash memory, a storage drive (such as a hard drive), a solid state drive, any type of storage disk (such as an optical disc, a DVD, etc.), or similar storage media, or a combination of them.

So far, the description of the structure of the electronic device shown in FIG. 9 is completed.

The system, apparatus, module, or unit described in the embodiments above can be specifically implemented by a computer chip or an entity, or a product with a certain function. A typical implementation device is a computer, and the specific form of the computer can be a personal computer, a laptop computer, a cellular phone, a camera phone, a smart phone, a personal digital assistant, a media player, a navigation device, an email sending and receiving device, and a game console, a tablet computer, a wearable device, or a combination of any of these devices.

For the convenience of description, when describing the above device, the functions are divided into various units and described separately. Of course, when implementing the present disclosure, the functions of each unit can be implemented in the same software or multiple software and/or hardware.

Those skilled in the art should understand that the embodiments of the present disclosure can be provided as a method, a system, or a computer program product. Therefore, the present disclosure can take the form of an entirely hardware embodiment, an entirely software embodiment, or an embodiment combining software and hardware aspects. Furthermore, the embodiments of the present disclosure can take the form of a computer program product implemented on one or more computer-usable storage media (including but not limited to disk storage, CD-ROM, optical storage, etc.) containing computer-usable program codes.

The present disclosure is described with reference to flowcharts and/or block diagrams of methods, devices (systems), and computer program products according to embodiments of the present disclosure. It should be understood that each process and/or block in the flowcharts and/or block diagrams, and combinations of processes and/or blocks in the flowcharts and/or block diagrams, can be implemented by computer program instructions. These computer program instructions can be provided to a processor of a general-purpose computer, a special-purpose computer, an embedded processor, or other programmable data processing device to produce a machine, so that the instructions can be executed by the processor of the computer or other programmable data processing device to produce means for implementing the functions specified in one or more processes of the flowcharts and/or one or more blocks of the block diagrams.

Moreover, these computer program instructions can also be stored in a computer-readable memory capable of directing a computer or other programmable data processing device to work in a specific manner, so that the instructions stored in the computer-readable memory produce a manufactured article including the instruction device, The instruction device implements the functions specified in one or more processes of the flowcharts and/or one or more blocks of the block diagrams.

These computer program instructions can also be loaded on a computer or other programmable data processing device, so that a series of operation steps can be performed on the computer or other programmable device to produce a computer-implemented process. Thus, the instructions executed on a computer or other programmable device provide steps for implementing the functions specified in one or more processes of the flowcharts and/or one or more blocks of the block diagrams.

The above are only examples of the present disclosure and are not intended to limit the present disclosure. For those skilled in the art, the present disclosure can have various modifications and changes. Any modification, equivalent replacement, and improvement made within the spirit and principle of the present disclosure shall be included in the scope of claims of the present disclosure.

The invention claimed is:

1. A method for updating a route, applied to an access device, the method comprising:
   receiving a first host route and a first sequence number of the first host route which are sent by a Border Gateway Protocol (BGP) peer of the access device; wherein the first sequence number is a basis for the BGP peer to determine the first host route to be sent;
   using the first host route as a route used by the access device to forward data to a host;
   deleting a recorded Address Resolution Protocol (ARP) entry corresponding to the host, wherein an Internet Protocol (IP) address in the ARP entry and an IP address of the host are the same as a prefix in the first host route;
   withdrawing a recorded third host route, wherein a type of the third host route is a specified type used to indicate that the third host route is generated based on ARP information in the ARP entry; and sending a route withdrawal message to the BGP peer of the access device, wherein the route withdrawal message is used to indicate that the third host route has been withdrawn;

wherein withdrawing the recorded third host route is performed simultaneously with deleting the recorded ARP entry or after deleting the recorded ARP entry.

2. The method according to claim 1, further comprising: sending an ARP request to the host, wherein a destination IP address of the ARP request is the same as the prefix in the first host route.

3. The method according to claim 2, further comprising: in response to no ARP response being received within a specified time period after the ARP request is sent, detecting whether a number of times for sending the ARP request has reached a preset number of times; and in response to the number of times for sending the ARP request not reaching the preset number of times, sending the ARP request for another time.

4. The method according to claim 2, further comprising: in response to an ARP response being received, learning ARP information based on the ARP response;

generating a second host route from the ARP information, wherein a type of the second host route is a specified type used to indicate that the second host route is generated based on the ARP information;

determining a second sequence number of the second host route;

sending the second host route and the second sequence number to the BGP peer of the access device; and updating the route used by the access device to forward data to the host from the first host route to the second host route.

5. The method according to claim 4, wherein determining the second sequence number of the second host route comprises:

checking whether there are one or more recorded host routes satisfying a condition, wherein the host route satisfying the condition is a host route with a same prefix/prefix length as that in the second host route, sent by the BGP peer and having a sequence number;

in response to there being no recorded host route satisfying the condition, taking a predefined initial value of a sequence number as the second sequence number of the second host route; and in response to there being one or more recorded host routes satisfying the condition, determining the second sequence number of the second host route based on sequence numbers of all of the recorded host routes satisfying the condition.

6. The method according to claim 5, wherein determining the second sequence number of the second host route based on the sequence numbers of all of the recorded host routes satisfying the condition comprises:

selecting a maximum sequence number having a largest value from the sequence numbers of all of the recorded host routes satisfying the condition; and taking a sum of the maximum sequence number and a specified value as the second sequence number of the second host route.

7. The method according to claim 1, wherein using the first host route as a route used by the access device to forward data to the host comprises:

checking whether there is an existing route used by the access device to forward data to the host in an IP forwarding table;

if there is no existing route used by the access device to forward data to the host, distributing the first host route to the IF forwarding table; and if there is an existing route used by the access device to forward data to the host, updating the existing route in the IP forwarding table to the first host route.

8. An access device, comprising: a processor and a machine-readable storage medium;

wherein the machine-readable storage medium stores machine-executable instructions executable by the processor; and the processor is configured to execute the machine-executable instructions to perform:

receiving a first host route and a first sequence number of the first host route which are sent by a Border Gateway Protocol (BGP) peer of the access device; wherein the first sequence number is a basis for the BGP peer to determine the first host route to be sent;

using the first host route as a route used by the access device to forward data to a host; and deleting a recorded Address Resolution Protocol (ARP) entry corresponding to the host, wherein an Internet Protocol (IP) address in the ARP entry and an IP address of the host are the same as a prefix in the first host route;

wherein in deleting the recorded ARP entry, or after deleting the recorded ARP entry, the processor is further configured to execute the machine-executable instructions to perform:

withdrawing a recorded third host route, wherein a type of the third host route is a specified type used to indicate that the third host route is generated based on ARP information in the ARP entry; and sending a route withdrawal message to the BGP peer of the access device, wherein the route withdrawal message is used to indicate that the third host route has been withdrawn.

9. The access device according to claim 8, the processor is further configured to execute the machine-executable instructions to perform:

sending an ARP request to the host, wherein a destination IP address of the ARP request is the same as the prefix in the first host route.

10. The access device according to claim 9, the processor is further configured to execute the machine-executable instructions to perform:

when no ARP response is received within a specified time period after the ARP request is sent, detecting whether a number of times for sending the ARP request has reached a preset number of times; and when the number of times for sending the ARP request has not reached the preset number of times, sending the ARP request for another time.

11. The access device according to claim 9, the processor is further configured to execute the machine-executable instructions to perform:

when an ARP response is received, learning ARP information based on the ARP response;

generating a second host route from the ARP information, wherein a type of the second host route is a specified type used to indicate that the second host route is generated based on the ARP information;

determining a second sequence number of the second host route;

sending the second host route and the second sequence number to the BGP peer of the access device; and updating the route used by the access device to forward data to the host from the first host route to the second host route.

12. The access device according to claim 11, in determining the second sequence number of the second host route, the processor is further configured to execute the machine-executable instructions to perform:
   checking whether there are one or more recorded host routes satisfying a condition, wherein the host route satisfying the condition is a host route with a same prefix/prefix length as that in the second host route, sent by the BGP peer and having a sequence number;
   when there is no recorded host route satisfying the condition, taking a predefined initial value of a sequence number as the second sequence number of the second host route; and
   when there are one or more recorded host routes satisfying the condition, determining the second sequence number of the second host route based on sequence numbers of all of the recorded host routes satisfying the condition.

13. The access device according to claim 12, in determining the second sequence number of the second host route based on the sequence numbers of all of the recorded host routes satisfying the condition, the processor is further configured to execute the machine-executable instructions to perform:
   selecting a maximum sequence number having a largest value from the sequence numbers of all of the recorded host routes satisfying the condition; and
   taking a sum of the maximum sequence number and a specified value as the second sequence number of the second host route.

14. The access device according to claim 8, in using the first host route as a route used by the access device to forward data to the host, the processor is further configured to execute the machine-executable instructions to perform:
   checking whether there is an existing route used by the access device to forward data to the host in an IP forwarding table;
   if there is no existing route used by the access device to forward data to the host, distributing the first host route to the IF forwarding table; and
   if there is an existing route used by the access device to forward data to the host, updating the existing route in the IP forwarding table to the first host route.

* * * * *